(12) United States Patent
Cruz

(10) Patent No.: US 11,096,372 B1
(45) Date of Patent: Aug. 24, 2021

(54) SIFTING WASTE SCOOPER

(71) Applicant: Pedro Cruz, Miami, FL (US)

(72) Inventor: Pedro Cruz, Miami, FL (US)

( * ) Notice: Subject to any disclaimer, the term of this patent is extended or adjusted under 35 U.S.C. 154(b) by 0 days.

(21) Appl. No.: 16/653,495

(22) Filed: Oct. 15, 2019

(51) Int. Cl.
*A01K 29/00* (2006.01)
*A01K 1/01* (2006.01)
*F21V 33/00* (2006.01)
*B07B 1/02* (2006.01)
*F21Y 115/10* (2016.01)

(52) U.S. Cl.
CPC .............. *A01K 1/0114* (2013.01); *B07B 1/02* (2013.01); *F21V 33/0004* (2013.01); *F21Y 2115/10* (2016.08)

(58) Field of Classification Search
CPC ...... A01K 1/0114; B07B 1/02; F21V 33/0004
USPC ....... 294/1.4, 179; 209/418, 419; 56/400.11; D8/13
See application file for complete search history.

(56) References Cited

U.S. PATENT DOCUMENTS

| | | | | |
|---|---|---|---|---|
| 1,094,161 A * | 4/1914 | Mueller | ................... | F24B 15/08 209/419 |
| 1,357,143 A * | 10/1920 | Brennan | ................. | F24B 15/08 209/419 |
| 1,409,572 A * | 3/1922 | Quinn | ..................... | F24B 15/08 209/419 |
| 1,554,525 A * | 9/1925 | Ricci | ....................... | F24B 15/08 209/419 |
| 2,545,226 A * | 3/1951 | Claude | ..................... | A01B 1/02 294/179 |
| 2,551,978 A * | 5/1951 | Smith | ..................... | F24B 15/08 209/419 |
| 3,188,666 A * | 6/1965 | Brown, Sr. | ............. | B21H 3/04 470/77 |
| D219,884 S * | 2/1971 | Patton | ............................. | D8/10 |
| 5,417,044 A * | 5/1995 | Russo | ..................... | A01K 1/01 56/400.11 |
| D393,300 S * | 4/1998 | Andrews | ..................... | D21/721 |
| 5,848,697 A | 12/1998 | Eash | | |
| 6,176,175 B1 * | 1/2001 | Moreth | ............... | A47J 37/1295 99/408 |
| 6,209,729 B1 * | 4/2001 | Brouillard | ............. | E04H 4/1609 15/1.7 |
| 7,484,859 B1 * | 2/2009 | Burke | ..................... | A47L 13/52 15/257.1 |
| 8,695,807 B2 * | 4/2014 | Knittel | ..................... | A01K 1/01 209/419 |

(Continued)

*Primary Examiner* — Paul T Chin
(74) *Attorney, Agent, or Firm* — Sanchelima & Associates, P.A.; Christian Sanchelima; Jesus Sanchelima

(57) ABSTRACT

A sifting waste scooper including a rod assembly and a basket assembly is disclosed herein. The rod assembly includes a telescoping rod and a battery. The battery is located at the bottom portion of the telescoping rod. The rod assembly further includes an LED attachment disposed at top portion of the elongated rod. The basket assembly is located the distal top portion of the elongated rod. Furthermore, the basket assembly includes a grated basket having a plurality of holes to allow soil and sand to sift through the basket while collecting waste. The basket assembly further includes a scraper along the outer portion of the grated basket to allow a user to pick up animal waste. The shifting waste scooper allows a user to pick up small objects of waste in soil or sand without having to carry the soil or sand into a waste container.

6 Claims, 3 Drawing Sheets

(56) References Cited

U.S. PATENT DOCUMENTS

| | | | | |
|---|---|---|---|---|
| D794,404 S | * | 8/2017 | Harris | D8/13 |
| 2004/0124646 A1 | * | 7/2004 | Peko | A01K 23/005 |
| | | | | 294/1.4 |
| 2015/0115634 A1 | * | 4/2015 | Young | E01H 1/1206 |
| | | | | 294/1.4 |
| 2017/0252779 A1 | * | 9/2017 | Price | F24B 15/007 |

* cited by examiner

SIFTING WASTE SCOOPER

BACKGROUND OF THE INVENTION

1. Field of the Invention

The present invention relates to a sifting waste scooper and, more particularly, to a sifting waste scooper that comprises a telescoping rod and a grated scoop to allow a user to effortlessly pick up waste in a sand environment.

2. Description of the Related Art

Several designs for a sifting waste scooper have been designed in the past. None of them, however, include a sifting device for beach trash pick-up having a grated scoop with a scraper along the distal front edge, a telescoping handle with a weighted rear portion juxtaposed the battery power source, and led as illumination source, along with your other disclosed features, was not specifically shown in the prior art provided with the original search. It is known that individuals often have the need to pick up waste from a sand environment such as a beach. It is also known that the waste includes small objects such as cigarette butts, candy wrappers, and the like. A user must often bend down often to pick up this waste resulting in back pain for a user. The present invention addresses this issue by providing a sifting waste scooper comprising an elongated rod and a grated scoop that allows a user to pick up waste in a sand environment without having to bend down.

Applicant believes that a related reference corresponds to U.S. Pat. No. 5,848,697 for a sifter employing a scoop formed of sheet metal and attached to a handle. However, it differs from the present invention because the U.S. Pat. No. 5,848,697 reference fails to provide an efficient and easy to use configuration the allows a user to pick up waste. The present invention addresses these issues by providing a telescoping rod to allow a user to configure the length of the scooper to their needs. The present invention additionally includes an LED attachment to allow a user to operate the scooper in a night time environment.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a sifting waste scooper that allows a user to pick up waste while not carrying dirt/sand into a waste container.

It is another object of this invention to provide a sifting waste scooper that alleviates back pain of a user by eliminating the need of having to bend down to pick up small pieces of trash such as cigarette butts.

It is still another object of the present invention to provide a sifting waste scooper that includes an LED light to allow the user to operate the invention in a night environment.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
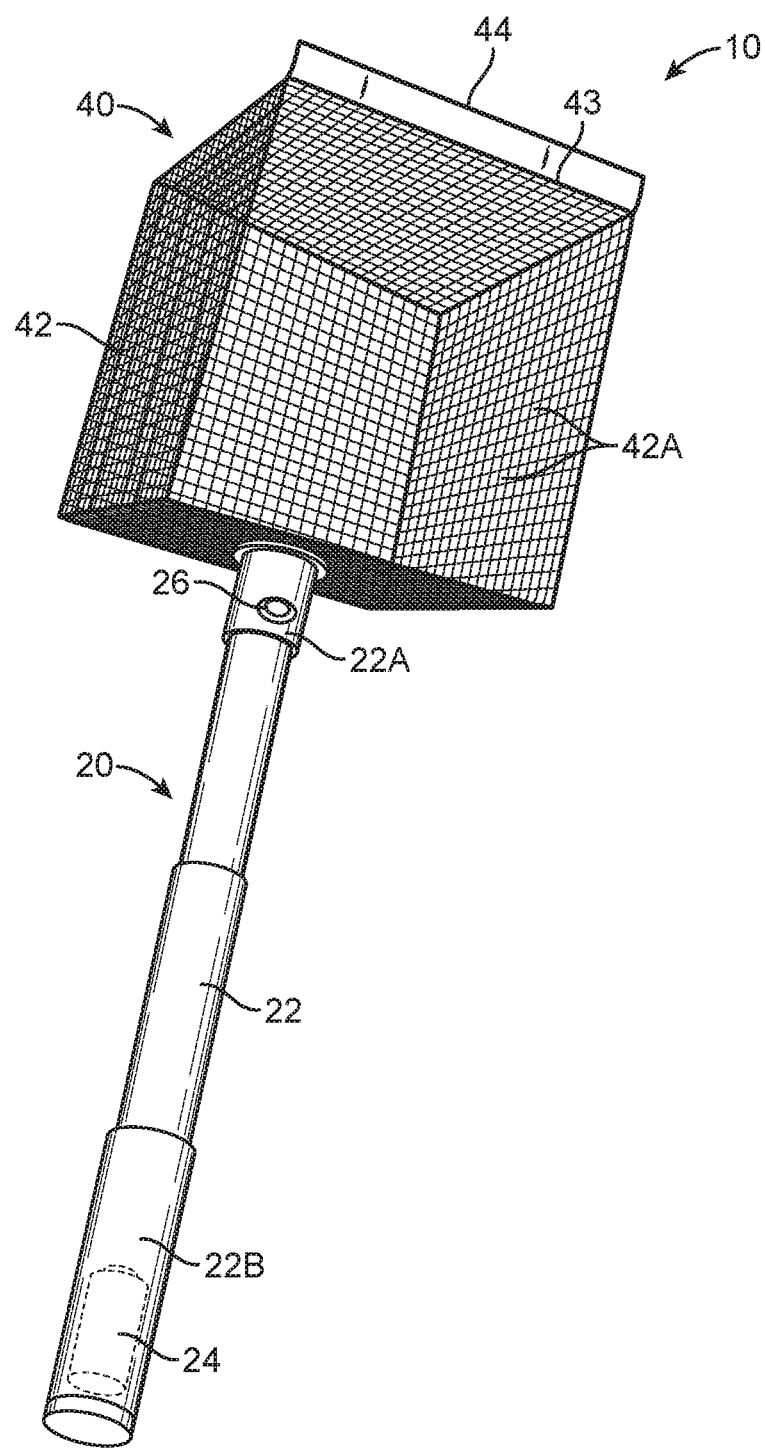
FIG. 1 represents an isometric view of a sifting waste scooper 10 wherein rod assembly 20 and basket assembly 40 may be viewed.
Figure 2:
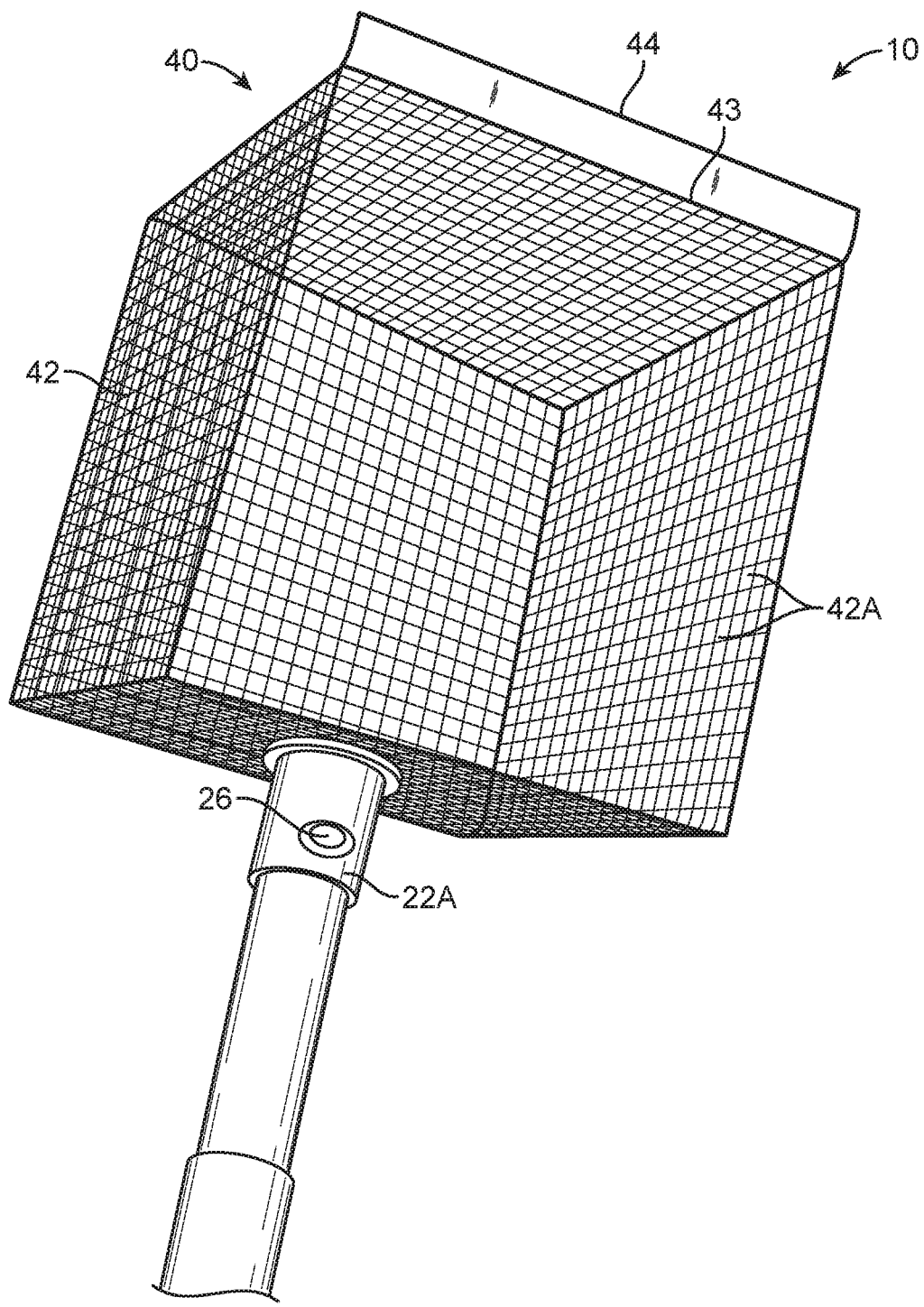
FIG. 2 shows an enlarged view of basket assembly 40 wherein grated basket 42 having a plurality of holes 42A may be observed.
Figure 3:
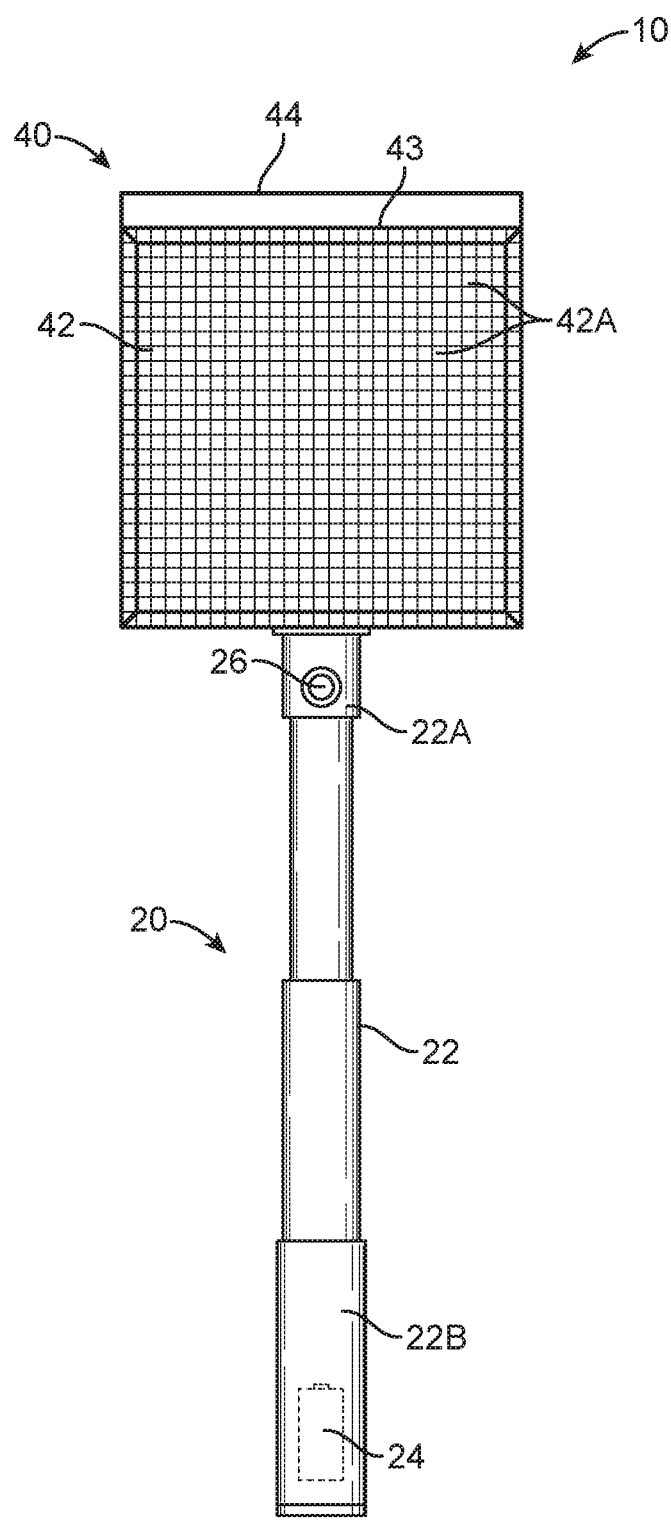
FIG. 3 illustrates a front view of sifting waste scooper 10 in accordance with one embodiment of the present invention.

Referring now to the drawings, where the present invention is generally referred to with numeral 10, it can be observed that a sifting waste scooper 10 that basically includes a rod assembly 20 and a basket assembly 40.

Rod assembly 20 includes a telescoping rod 22 having a top portion 22A and a bottom portion 22B. Telescoping rod 22 may be made of any suitable material such as plastic, aluminum and the like, for a user to hold. Additionally, telescoping rod 22 is adjustable to be configured to the necessary length needed from a user. In one embodiment of the present invention, telescoping rod 22 is cylindrical in shape. However, it should be understood that telescoping rod 22 may be of any suitable shape such rectangular, triangular, and the like. Telescoping rod 22 further includes a battery 24 located at bottom portion 22B. Battery 24 may be mounted onto said bottom portion 22B by means of known mechanisms such as adhesives, fasteners and the like. Telescoping rod 22 also further includes an LED attachment disposed at top portion 22A of telescoping rod 22. Battery 24 provides power to LED attachment 26 to produce illumination for a user so that they may operate sifting waste scooper 10 in a night environment. It should be understood that LED attachment 26 may illuminate any suitable color of light for a user to use sifting waste scooper 10 in a night environment. Rod assembly 20 has basket assembly 40 disposed on the distal part of top portion 22A of telescopic rod 22.

Basket assembly 40 includes a grated basket 42. Grated basket 42 comprises a plurality of holes 42A disposed along the outer surface area of grated basket 42. In one embodiment of the present invention, a user utilizes sifting waste scooper 10 to pick up small objects of waste such as cigarette butts, candy wrappers, and the like, in a sand environment or soil environment. As a user utilizes sifting waste scooper 10 to pick up waste objects, the user picks up the waste along with sand or soil without having to bend down. Plurality of holes 42A allows the soil or sand to sift through grated basket 42 leaving behind only the waste in grated basket 42 to be disposed by the user. Grated basket 42 may be made of any suitable material such as plastic, metal, and the like. Grated basket 42 further includes a scraper 44 located along a basket edge 43 of grated basket 42. In the present embodiment, scraper 44 is used to aid a user in disposing animal waste. Scrapper 44 may be made of any suitable material such as metal, plastic and the like to aid a user in scraping animal waste. In one embodiment of the present invention, scraper 44 is rectangular in shape and extends along the entire outer perimeter of basket edge 43.

Although the present embodiment depicts one scraper 44 along one basket edge 43, it should be understood that additional basket edges may include additional scrappers in other embodiments of the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a sifting waste scooper, comprising:
    a. a rod assembly, including a telescoping rod having a top portion and a bottom portion, wherein said telescoping rod includes cylindrical attachments each having a predetermined diameter, wherein said cylindrical attachments fit inside one another to form said telescoping rod, wherein said telescoping rod is adjustable at said each of said cylindrical attachments, said rod assembly further including a battery disposed on said bottom portion of said telescoping rod, said rod assembly further including an LED attachment disposed on the top portion of said telescoping rod, wherein said LED attachment is a flat circle that is mounted parallel to said lateral exterior of the top portion; and
    a basket assembly including a basket with a top open portion along a top edge of four lateral walls, said basket includes an entire surface area that is grated, the basket includes a mounting point for said top portion of the rod assembly, wherein said mounting point is located on a lateral wall of said basket.

2. The system for a sifting waste scooper of claim 1, wherein said grated basket includes four lateral walls extending an equal length outward and perpendicularly with respect to a bottom wall.

3. The system for a sifting waste scooper of claim 1, wherein said telescoping rod is cylindrical in shape and extends via concentric rods housed therein to culminate in a top portion.

4. The system for a sifting waste scooper of claim 1, wherein said scraper is rectangular in shape and located along an entire top edge of the lateral wall opposite to said mounting point.

5. The system for a sifting waste scooper of claim 1, wherein said basket assembly is mounted in constant abutment to the top portion of the telescoping rod along one of the lateral four walls opposite the scraper.

6. A system for a sifting waste scooper, consisting of:
    a. A rod assembly including a telescoping rod, said telescoping rod having a bottom portion and a top portion, the bottom portion of the telescoping rod houses a battery, said bottom portion is cylindrical and extends via concentric rods housed therein to culminate in a top portion, said top portion being cylindrical and wider in diameter than said concentric rods, said top portion also includes a head portion extending circumferentially about a top edge, the top portion includes an LED attachment mounted directly to a lateral exterior of said top portion, wherein said LED attachment is a flat circle that is mounted parallel to said lateral exterior of the top portion; and
    b. a basket assembly being a hollow box defining a basket, said basket includes a top open portion along a top edge of four lateral walls, said four lateral walls extending an equal length outward and perpendicularly with respect to a bottom wall, said basket includes an entire surface area that is grated, the basket includes a mounting point for said top portion of the rod assembly, wherein said mounting point is located on a lateral wall of said basket, the basket assembly also includes a scraper, said scraper is mounted to a top edge of an opposite lateral wall with respect to said mounting point for the rod assembly, the scraper is rectangular and is attached along an entire top edge of said opposite lateral wall, wherein said scraper includes a continuous and flat distal edge.

\* \* \* \* \*